(12) United States Patent
Hyun et al.

(10) Patent No.: US 12,328,494 B2
(45) Date of Patent: Jun. 10, 2025

(54) CAMERA MODULE

(71) Applicant: Samsung Electro-Mechanics Co., Ltd., Suwon-si (KR)

(72) Inventors: Hae Seung Hyun, Suwon-si (KR); Hyun Kim, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 229 days.

(21) Appl. No.: 18/196,883

(22) Filed: May 12, 2023

(65) Prior Publication Data
US 2024/0155216 A1    May 9, 2024

(30) Foreign Application Priority Data

Nov. 9, 2022  (KR) .................... 10-2022-0149006

(51) Int. Cl.
*H04N 23/57*    (2023.01)
*G03B 5/00*    (2021.01)
(Continued)

(52) U.S. Cl.
CPC .............. *H04N 23/57* (2023.01); *G03B 5/00* (2013.01); *G03B 13/36* (2013.01); *G03B 17/12* (2013.01);
(Continued)

(58) Field of Classification Search
CPC ........ G03B 17/12; G03B 17/17; G03B 30/00; G03B 5/00; G03B 13/36;
(Continued)

(56) References Cited

U.S. PATENT DOCUMENTS 6,282,022 B1 * 8/2001 Abe .................. G02B 23/14
359/431
7,522,336 B2 * 4/2009 Hermann ........... G02B 21/20
359/368
(Continued)

FOREIGN PATENT DOCUMENTS

CN    102385142 A    3/2012
CN    212410946 U    1/2021
(Continued)

OTHER PUBLICATIONS

Litchfield, Steve, "Huawei's P40 series launched, ambitious optical paths," All About Windows Phone [online], published 12:18 UTC, Mar. 27, 2020, http://allaboutwindowsphone.com/flow/item/23824_Huaweis_P40_series_launched_am.php (1 page).
(Continued)

*Primary Examiner* — Pritham D Prabhakher
(74) *Attorney, Agent, or Firm* — NSIP Law

(57) ABSTRACT

A camera module includes a plurality of lens modules having mutually different optical axes, a plurality of reflective members configured to change a path of light passing through at least one of the plurality of lens modules, and a housing having an internal space in which at least one of the plurality of lens modules is disposed. The plurality of lens modules include a first lens module including at least one lens disposed along a first optical axis, a second lens module including at least one lens disposed along a second optical axis, and a third lens module including at least one lens disposed along a third optical axis. The plurality of reflective members include a first reflective member opposing both the first lens module and the second lens module, and a second reflective member opposing both the second lens module and the third lens module.

24 Claims, 4 Drawing Sheets

(51) Int. Cl.
  *G03B 13/36* (2021.01)
  *G03B 17/12* (2021.01)
  *G03B 17/17* (2021.01)
  *G03B 30/00* (2021.01)

(52) U.S. Cl.
  CPC ............. *G03B 17/17* (2013.01); *G03B 30/00* (2021.01); *G03B 2205/0046* (2013.01); *G03B 2205/0069* (2013.01)

(58) Field of Classification Search
  CPC .... G03B 2205/0069; G03B 2205/0046; H04N 23/55; H04N 23/00; H04N 23/45; H04N 23/57
  USPC .......................................................... 348/345
  See application file for complete search history.

(56) References Cited

U.S. PATENT DOCUMENTS

| | | | | |
|---|---|---|---|---|
| 7,646,418 B2* | 1/2010 | Nanjo | ............ | G02B 15/145 348/335 |
| 11,528,396 B2* | 12/2022 | Lin | .............. | G02B 17/06 |
| 11,635,596 B2* | 4/2023 | Bachar | ............. | G02B 13/003 359/641 |
| 11,640,047 B2* | 5/2023 | Bachar | ............. | G03B 13/32 359/556 |
| 11,796,764 B2* | 10/2023 | Huh | ............. | G02B 9/60 |
| 11,899,186 B2* | 2/2024 | Yao | ............. | H04N 23/55 |
| 11,940,716 B2* | 3/2024 | Kwon | ............. | G02B 7/1805 |
| 12,013,519 B2* | 6/2024 | Kim | ............. | G02B 15/142 |
| 2007/0126911 A1 | 6/2007 | Nanjo | | |
| 2014/0112651 A1* | 4/2014 | Sato | ............. | G02B 15/143 507 396/379 |
| 2020/0319439 A1* | 10/2020 | Byon | ............. | H04N 23/55 |
| 2021/0325643 A1* | 10/2021 | Bachar | ............. | G02B 13/18 |
| 2022/0113520 A1* | 4/2022 | Kim | ............. | G02B 13/0045 |
| 2022/0146912 A1* | 5/2022 | Kwon | ............. | G02B 7/1805 |

FOREIGN PATENT DOCUMENTS

| | | |
|---|---|---|
| CN | 112637467 A | 4/2021 |
| CN | 112824964 B | 10/2022 |
| JP | 2006-106309 A | 4/2006 |
| KR | 10-2007-0052213 A | 5/2007 |

OTHER PUBLICATIONS

Korean Office Action issued on Sep. 25, 2024, in counterpart Korean Patent Application No. 10-2022-0149006 (10 pages in English, 6 pages in Korean).

* cited by examiner

CAMERA MODULE

CROSS-REFERENCE TO RELATED APPLICATIONS

This application claims the benefit under 35 USC 119(a) of Korean Patent Application No. 10-2022-0149006 filed on Nov. 9, 2022 in the Korean Intellectual Property Office, the entire disclosure of which is incorporated herein by reference for all purposes.

BACKGROUND

1. Field

The present disclosure relates to a camera module providing a magnification function and an autofocus adjustment function.

2. Description of Related Art

As communications technology has developed, mobile devices such as smartphones have become widely available, and a demand for additional functions of a camera module included in a mobile device has been gradually increasing. For example, a camera module in a mobile device may include advanced shooting functions (for example, an autofocus adjustment function, an anti-shake function, a magnification function, other functions) that have previously been implemented in a conventional DSLR camera, despite a small size of the camera module in the mobile device.

In particular, as the performance desired for camera modules in mobile devices increases, the number of camera modules has tended to increase in order to implement a high-magnification zoom within a limited internal space of the mobile device, and a periscope-type camera module has in which a light path is bent more than once has been developed.

In a camera module according to the related art including such a periscope-type camera module, an autofocus adjustment function, a magnification function, and other functions may be performed by moving a lens. To this end, the camera module may be configured to drive the lens using an actuator generating a magnetic field. An electromagnetic field generated by the magnetic field of the actuator may negatively affect operations of peripheral electronic components in a mobile device in which the camera module is mounted. Accordingly, a low magnetic field design is desirable in the camera module.

A low magnetic field design may be implemented by, for example, reducing an intensity of permanent magnets forming a magnetic field. However, a magnetic field having a certain intensity or more is needed to provide a driving force sufficient for driving the lens, so that an appropriate trade-off between the low magnetic field design and the provision of a sufficient driving force is necessary.

In particular, in order to implement a high-magnification zoom, the lens needs to move a relatively long distance, and thus the low magnetic design becomes more difficult to implement. For example, when the lens is driven using a voice coil motor (VCM) actuator, a length of a magnet inevitably increases as a stroke increases.

As the stroke of the lens increases, a power consumption increases. Accordingly, a magnification control function implemented by driving the lens has a downside despite a low-power design.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a camera module includes a plurality of lens modules having mutually different optical axes; a plurality of reflective members configured to change a path of light passing through at least one of the plurality of lens modules; and a housing having an internal space in which at least one of the plurality of lens modules is disposed, wherein the plurality of lens modules include a first lens module including at least one lens disposed along a first optical axis; a second lens module including at least one lens disposed along a second optical axis different from the first optical axis; and a third lens module including at least one lens disposed along a third optical axis different from the first optical axis and the second optical axis, and the plurality of reflective members include a first reflective member opposing both the first lens module and the second lens module; and a second reflective member opposing both the second lens module and the third lens module.

The camera module may further include a first driver configured to generate a driving force for moving the first reflective member with respect to the first lens module and the second lens module; and a second driver configured to generate a driving force for moving the second reflective member with respect to the second lens module and the third lens module.

The first lens module, the second lens module, and the third lens module may be fixed with respect to the housing.

The first reflective member may include a first reflective surface through which the first optical axis passes and a second reflective surface through which the second optical axis passes, and the second reflective member may include a third reflective surface through which the second optical axis passes and a fourth reflective surface through which the third optical axis passes.

The first reflective member may be configured to be movable with respect to the housing in a first direction, and the second reflective member may be configured to be movable with respect to the housing in a second direction parallel to the first direction.

The camera module may further include an image sensor on which light passing through the plurality of lens modules is incident.

The first optical axis, the second optical axis, and the third optical axis may be parallel to each other.

The camera module may further include a third reflective member opposing the first reflective member; and the first lens module may be disposed between the third reflective member and the first reflective member.

In another general aspect, a camera module includes a first lens module including at least one lens disposed along a first optical axis; a second lens module including at least one lens disposed along a second optical axis different from the first optical axis; an image sensor having an imaging surface perpendicular to a third optical axis parallel to the second optical axis; a first reflective member configured to change a path of light passing through the first lens module to the second optical axis; a second reflective member configured to change a path of light passing through the second lens module along the second optical axis to the third optical axis; a first driver configured to move the first reflective member in a first direction parallel to the second optical axis; and a second driver configured to move the second reflective member in a second direction parallel to the second optical axis and different from the first direction.

The camera module may further include a housing in which the second lens module, the first reflective member, and the second reflective member are disposed, and the first lens module and the second lens module may be fixedly coupled to the housing, and the first reflective member and the second reflective member may be movably coupled to the housing.

The camera module may further include a third reflective member disposed on an object side of the first lens module and configured to change a path of light incident on the third reflective member along an optical axis intersecting the first optical axis to the first optical axis, and the first reflective member may be further configured to change a path of light passing through the first lens module along the first optical axis to the second optical axis.

The camera module may further include a third lens module disposed between the second reflective member and the image sensor and including at least one lens disposed along the third optical axis.

The camera module may further include a third driver configured to move the image sensor in a third direction parallel to the third optical axis.

The first reflective member may include a first reflective surface forming an angle of 45 degrees with respect to the first optical axis and a second reflective surface forming an angle of 90 degrees with respect to the first reflective surface, and the second reflective member may include a third reflective surface forming an angle of 45 degrees with respect to the second optical axis and a fourth reflective surface forming an angle of 90 degrees with respect to the third reflective surface.

The camera module may further include a third reflective member disposed on an image side of the first lens module and configured to change a path of light passing through the first lens module along the first optical axis to an optical axis perpendicular to the first optical axis, and the first reflective member may be further configured to change a path of light from the first lens module and the third reflective member traveling along the optical axis perpendicular to the first optical axis to the second optical axis.

The first optical axis and the second optical axis may be perpendicular to each other, and the third reflective member may oppose the first reflective member in a direction parallel to the second optical axis.

In another general aspect, a camera module includes a first lens module including at least one lens disposed along a first optical axis; a second lens module including at least one lens disposed along a second optical axis different from the first optical axis; an image sensor having an imaging surface perpendicular to a third optical axis different from the first optical axis and the second optical axis and parallel to the second optical axis; a first reflective member configured to change a path of light passing through the first lens module to the second optical axis and to be movable in a first direction parallel to the second optical axis to adjust a magnification of the camera module; and a second reflective member configured to change a path of light passing through the second lens module along the second optical axis to the third optical axis and to be movable in a second direction parallel to the second optical axis and different from the first direction.

The second reflective member may be further configured to be movable in the second direction to adjust a focus of the camera module.

The camera module may further include a third lens module disposed between the second reflective member and the image sensor and including at least one lens disposed along the third optical axis, the second reflective member may be further configured to be movable in the second direction to prevent a degradation of a resolution of the camera module as the magnification of the camera module is adjusted by a movement of the first reflective member, and the image sensor may be configured to be movable in a third direction parallel to the third optical axis to adjust a focus of the camera module.

A distance the second reflective member moves in the second direction to prevent the degradation of the resolution of the camera module may depend on a distance the first reflective member moves in the first direction to adjust the magnification of the camera module.

In another general aspect, a camera module includes a first lens module including at least one lens disposed along a first optical axis; a second lens module including at least one lens disposed along a second optical axis different from the first optical axis; a first reflective member configured to change a path of light passing through the first lens module to the second optical axis and to be movable in a first direction parallel to the second optical axis; a second reflective member configured to change a path of light passing through the second lens module along the second optical axis to a third optical axis different from the first optical axis and the second optical axis and parallel to the second optical axis; and a housing in which the second lens module, the first reflective member, and the second reflective member are disposed, wherein the first lens module and the second lens module are fixed with respect to the housing, the first reflective member may be configured to be movable with respect to the housing in a first direction parallel to the second optical axis, and the second reflective member may be configured to be movable with respect to the housing in a second direction parallel to the second optical axis and different from the first direction.

The camera module may further include a third reflective member disposed in the housing, the first lens module may be disposed in the housing between the third reflective member and the first reflective member and may be fixed with respect to the housing, the third reflective member may be configured to change a path of light incident on the third reflective member along an optical axis perpendicular to the first optical axis to the first optical axis, and the first optical axis may be different from and parallel to the second optical axis and the third optical axis.

The camera module may further include a third reflective member disposed in the housing and facing the first reflective member along the first optical axis; an image sensor disposed in the housing and facing the second reflective member along the third optical axis; and a third lens module disposed in the housing between the second reflective member and the image sensor and including at least one lens disposed along the third optical axis, the first lens module may be disposed between the third reflective member and the first reflective member and may be fixed with respect to the housing, and the image sensor may be configured to be movable with respect to the housing in a third direction parallel to the third optical axis.

The camera module may further include a third reflective member disposed in the housing, the first lens module may be disposed outside the housing facing the first reflective member, the third reflective member may be configured to change a path of light passing through the first lens module along the first optical axis to an optical axis perpendicular to the first optical axis and parallel to and different from the second optical axis and the third optical axis, and the first optical axis may be different from and perpendicular to the second optical axis and the third optical axis.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
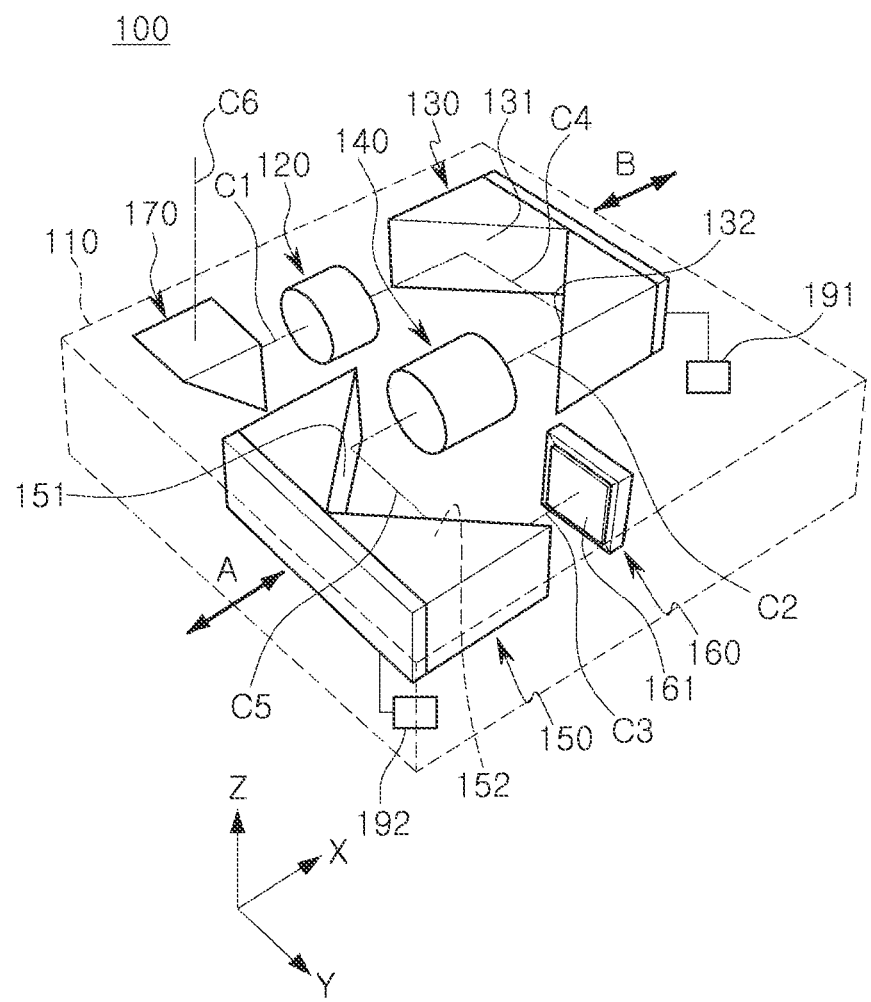
FIG. 1 illustrates a configuration of an example of a camera module.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated by 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

As used herein, an X-direction, a Y-direction, and a Z-direction refer to a direction parallel to an X-axis, a direction parallel to a Y-axis, and a direction parallel to a Z-axis illustrated in the drawings, respectively. In addition, unless otherwise described, the X-direction includes both a +X-axis direction and a −X-axis direction, which is also applied to the Y-direction and the Z-direction.

Figure 2:
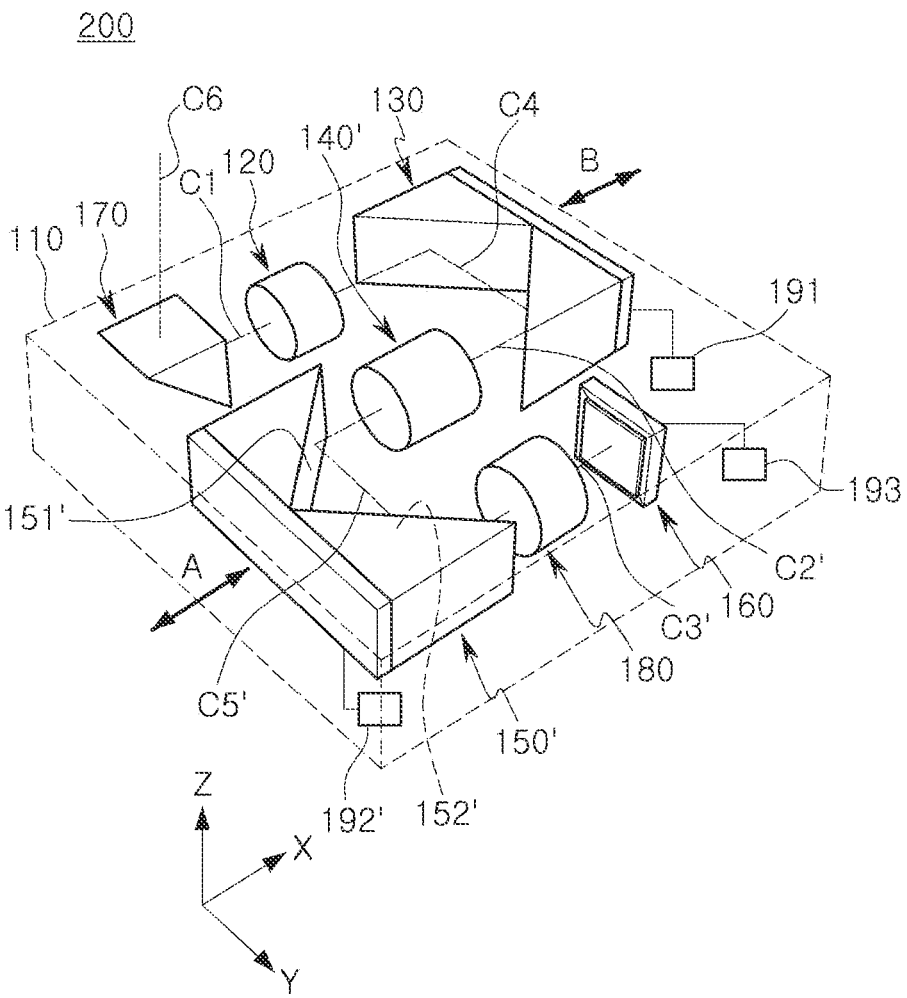
FIG. 2 illustrates a configuration of another example of a camera module.
Figure 3:
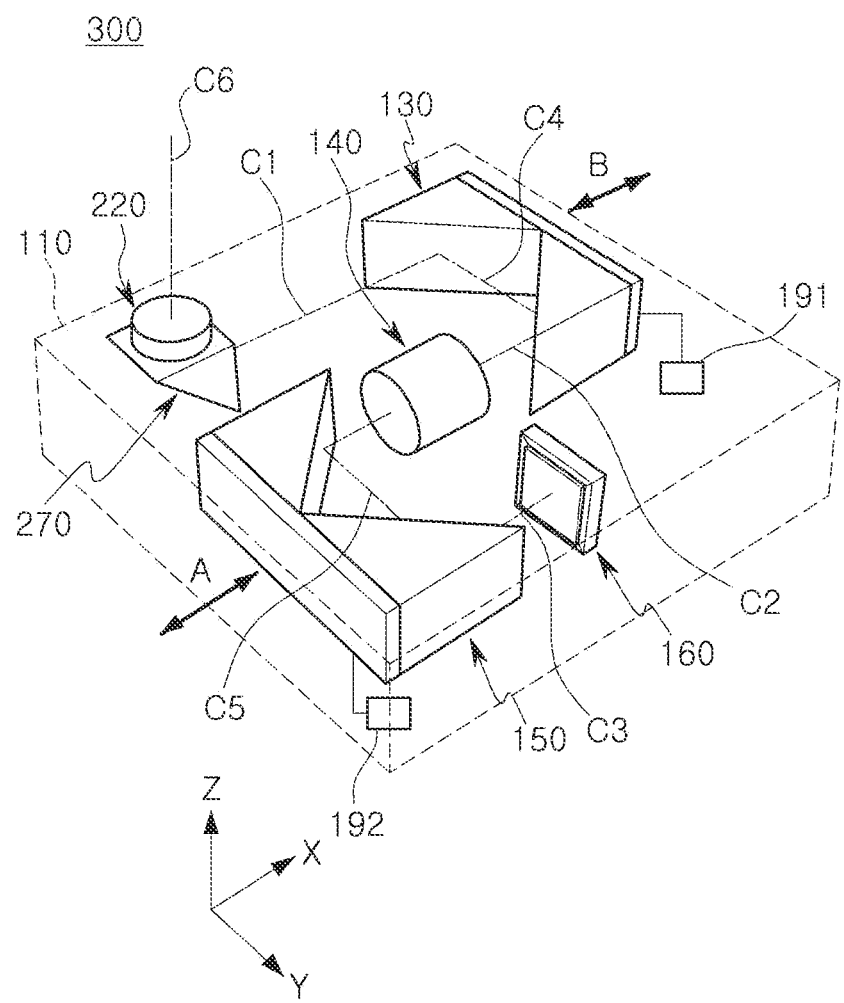
FIG. 3 illustrates a configuration of another example of a camera module.
Figure 4:
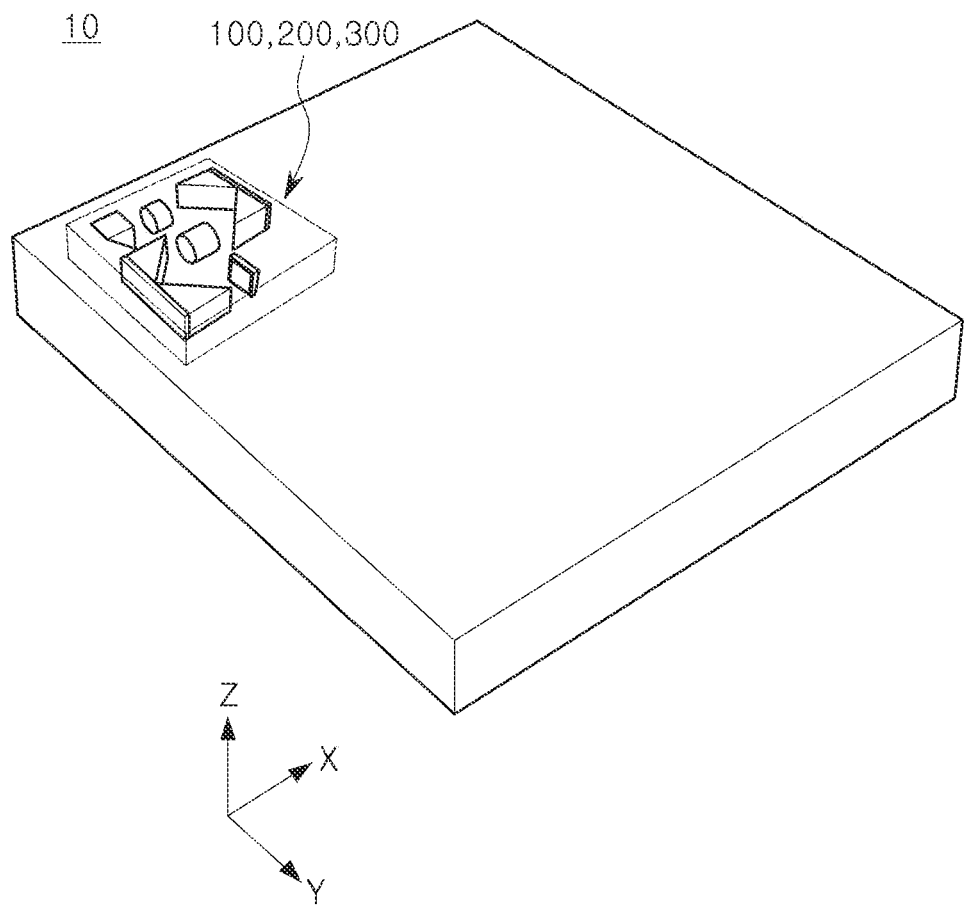
FIG. 4 illustrates an electronic device including any of the camera modules of FIGS. 1 to 3.

FIG. 1 illustrates a configuration of an example of a camera module. FIG. 2 illustrates a configuration of another example of a camera module. FIG. 3 illustrates a configuration of another example of a camera module. FIG. 4 illustrates an electronic device including any of the camera modules of FIGS. 1 to 3.

Hereinafter, an example of a camera module 100 will be described with reference to FIG. 1.

Referring to FIG. 1, a camera module 100 may include one or more reflective members, a plurality of lens modules, and an image sensor. For example, the camera module 100 may include a first lens module 120, a second lens module 140, a first reflective member 130, a second reflective member 150, and an image sensor 160. In addition, the camera module 100 may further include a housing 110 having an internal space in which the above-described components are accommodated.

Each of the first and second lens modules 120 and 140 may include a lens barrel and at least one lens accommodated in the lens barrel.

The camera module 100 may include the first and second lens modules 120 and 140 to perform a focus adjustment function and a zoom function. For example, as a distance between the first and second lens modules 120 and 140 changes, a size of an image obtained by the image sensor 160 may be adjusted. In addition, as a distance between the image sensor 160 and the second lens module 140 changes, the focus adjustment function of the camera module 100 may be performed.

The camera module 100 may include one or more reflective members. Each reflective member may be configured to change a light path. For example, each reflective member may include a prism or a mirror.

Referring to FIG. 1, the camera module 100 may include a plurality of reflective members. The plurality of reflective members may be disposed at various positions on the light path.

For example, a third reflective member 170 may be disposed in front of the first and second lens modules 120 and 140 on the light path. Accordingly, light reflected by the reflective member may pass through the first and second lens modules 120 and 140.

The first reflective member 130 may be disposed on a light path between the first lens module 120 and the second lens module 140. Accordingly, light passing through the first lens module 120 may be reflected at least once by the reflective member 130 to enter the second lens module 140.

The second reflective member 150 may be disposed behind the first and second lens modules 120 and 140 on the light path to reflect light passing through the first and second lens modules 120 and 140 at least once, thereby allowing the light to be directed toward an imaging surface 161 of the image sensor 160.

The light path may be bent at least once due to the first, second, and third reflective members 130, 150, and 170, which may prevent a length of the camera module 100 from becoming longer than an appropriate length in a particular direction. For example, referring to FIG. 1, light passing through the first lens module 120 may be bent by the first reflective member 130 to enter the second lens module 140. When light enters in an X-direction from the first lens module 120 to the second lens module 140 without the first reflective member 130, a length of the camera module 100 in the X-direction may significantly increase, making it difficult to compactly design the camera module 100. However, the first reflective member 130 may form a light path bent one or more times from the first lens module 120 to the second lens module 140 so that the length of the camera module 100 in the X-direction may be designed more compactly.

The camera module 100 may drive the first and second reflective members 130 and 150 disposed on the light path passing through the first and second lens modules 120 and 140 to extend or reduce a length of the light path. The camera module 100 may include drivers 191 and 192 shown schematically in FIG. 1 for driving the reflective members 130 and 150. Accordingly, a length of the light path between the first lens module 120 and the second lens module 140 may be changed to perform a zoom function of the camera module 100, and a length of the light path between the second lens module 140 and the image sensor 160 may be changed to perform a focus adjustment function of the camera module 100.

Hereinafter, the first and second lens modules 120 and 140 and the first, second, and third reflective members 130, 150, and 170 included in the camera module 100 will be described in more detail.

The camera module 100 may include a plurality of lens modules having different optical axes. For example, the camera module may include a first lens module having a first optical axis and a second lens module having a second optical axis. The first optical axis and the second optical axis may be different from each other. For example, the first optical axis and the second optical axis may be spaced apart from each other and may be parallel to each other as shown in FIG. 1.

The first lens module 120 may include at least one lens defining a first optical axis C1. That is, the at least one lens of the first lens module 120 may be disposed along the first optical axis C1.

The first lens module 120 may be disposed to oppose at least a portion of the first reflective member 130 in a direction of the first optical axis C1. For example, the first lens module 120 may be disposed so that light passing through the first lens module 120 in the direction of the first optical axis C1 is incident on a first reflective surface 131 of the first reflective member 130.

The light may enter the first reflective member 130 after passing through the first lens module 120 along the first optical axis C1. The first reflective member 130 may include a plurality of reflective surfaces, and may change a path of travel of light incident on the first optical axis C1 in a direction toward the second lens module 140.

The first reflective member 130 may include a first reflective surface 131 capable of changing a travel direction of light entering the first reflective member 130 along the first optical axis C1 to a direction parallel to a fourth optical axis C4. The first optical axis C1 and the fourth optical axis C4 may be perpendicular or substantially perpendicular to each other. For example, referring to FIG. 1, the first optical axis C1 may be parallel to an X-axis, and the fourth optical axis C4 may be parallel to a Y-axis.

The first reflective surface 131 may be inclined with respect to the first optical axis C1. For example, the first reflective surface 131 may form an angle of 45 degrees with respect to the first optical axis C1.

The first reflective member 130 may include a second reflective surface 132 capable of changing a path of travel of light reflected by the first reflective surface 131.

The second reflective surface 132 may be inclined with respect to the fourth optical axis C4. For example, the second reflective surface 132 may form an angle of 45 degrees with respect to the fourth optical axis C4.

Light traveling from the first reflective surface 131 to the second reflective surface 132 along the fourth optical axis C4 may be reflected by the second reflective surface 132 so that a path of travel thereof may be bent to be parallel to the second optical axis C2. The second optical axis C2 may be perpendicular or substantially perpendicular to the fourth optical axis C4. For example, the second optical axis C2 may be parallel to the X axis, and the fourth optical axis C4 may be parallel to the Y axis. Furthermore, the second optical axis C2 may be parallel to the first optical axis C1.

The first reflective surface 131 and the second reflective surface 132 may be perpendicular or substantially perpendicular to each other. Accordingly, light reflected by the first reflective surface 131 and traveling straight in a direction of the fourth optical axis C4 may be reflected again perpendicularly or substantially perpendicularly by the second reflective surface 132, and may be incident on the second lens module 140 in a direction of the second optical axis C2.

As described above, light incident on the camera module 100 from an external subject may have a path of travel from the first lens module 120 to the second lens module 140 that has been bent multiple times by the first reflective member 130.

As illustrated in FIG. 1, the first reflective member 130 may be formed as an integral member in which both the first reflective surface 131 and the second reflective surface 132 are formed in one body, but a specific structure thereof is not limited thereto.

The second lens module 140 may include at least one lens defining the second optical axis C2. That is, the at least one lens of the second lens module 140 may be disposed along the second optical axis C2. The first optical axis C1 and the second optical axis C2 may be parallel to each other.

The second lens module 140 may be disposed to oppose at least a portion of the first reflective member 130 in the direction of the second optical axis C2. For example, the second lens module 140 may be disposed so that light emitted from the second reflective surface 132 of the first reflective member 130 in the direction of the second optical axis C2 is incident on the second lens module 140.

The second lens module 140 may be disposed between the first reflective member 130 and the second reflective member 150. Light passing through the second lens module 140 may enter the second reflective member 150 along the second optical axis C2.

The second reflective member 150 may include a plurality of reflective surfaces so that light incident on the second optical axis C2 may be emitted along a third optical axis C3 parallel to the second optical axis C2.

The second reflective member 150 may include a third reflective surface 151 capable of changing a travel direction of light entering along the second optical axis C2 to a direction parallel to a fifth optical axis C5. The fifth optical axis C5 may be perpendicular or substantially perpendicular to the second optical axis C2. For example, referring to FIG. 1, the second optical axis C2 may be parallel to the X-axis, and the fifth optical axis C5 may be parallel to the Y-axis.

The third reflective surface 151 of the second reflective member 150 may be disposed to oppose the second lens module 140, and may be inclined with respect to the second optical axis C2. For example, the third reflective surface 151 may form an angle of 45 degrees with respect to the second optical axis C2.

The third reflective surface 151 may be perpendicular to the first reflective surface 131 of the first reflective member 130, and may be substantially parallel to the second reflective surface 132 of the first reflective member 130.

The second reflective member 150 may further include a fourth reflective surface 152 capable of changing a path of travel of light reflected by the third reflective surface 151.

Light traveling from the third reflective surface 151 to the fourth reflective surface 152 along the fifth optical axis C5 may be reflected by the fourth reflective surface 152 so that a path of travel thereof may be bent to be parallel to the third optical axis C3. The third optical axis C3 may be parallel to the second optical axis C2. For example, the third optical axis C3 may be parallel to the X-axis. Light reflected by the fourth reflective surface 152 may travel in a direction parallel to the third optical axis C3.

The fourth reflective surface 152 may be inclined with respect to the fifth optical axis C5. For example, the fourth reflective surface 152 may form an angle of 45 degrees with respect to the fifth optical axis C5.

The third reflective surface 151 and the fourth reflective surface 152 may be perpendicular or substantially perpendicular to each other. Accordingly, light reflected by the third reflective surface 151 and traveling straight in a direction of the fifth optical axis C5 may be reflected again perpendicularly or substantially perpendicularly by the fourth reflective surface 152, and may travel in a direction of the third optical axis C3.

The fourth reflective surface 152 may be parallel to the first reflective surface 131 of the first reflective member 130, and may be substantially perpendicular to the second reflective surface 132 of the first reflective member 130.

As described above, light incident on the camera module 100 from an external subject may have a path of travel that has been bent multiple times by the first and second reflective members 130 and 150 after passing through the second lens module 140.

As illustrated in FIG. 1, the second reflective member 150 may be formed as an integral member in which both the third reflective surface 151 and the fourth reflective surface 152 are formed in one body, but a specific structure thereof is not limited thereto.

Light emitted from the second reflective member 150 in the direction of the third optical axis C3 may be incident on the imaging surface 161 of the image sensor 160.

In the camera module 100, the reflective members 130 and 150 may be configured to be movable with respect to the housing 110 so that a length of the light path between the first and second lens modules 120 and 140 may be changed, and a length of the light path between the second lens module 140 and the image sensor 160 may be changed.

The camera module 100 may include a first driver 191 for adjusting a length of a light path between the first lens module 120 and the second lens module 140.

The first driver 191 may move the first reflective member 130 with respect to the first lens module 120 and the second lens module 140. Alternatively, the first driver 191 may move the first reflective member 130 with respect to the housing 110.

The first driver 191 may move the first reflective member 130 in a direction B parallel to the first optical axis C1 and the second optical axis C2 to adjust the length of the light path between the first lens module 120 and the second lens module 140. For example, referring to FIG. 1, the first driver 191 may move the first reflective member 130 in a positive X-axis direction to make the length of the light path between the first lens module 120 and the second lens module 140 longer. Alternatively, the first driver 191 may move the first reflective member 130 in a negative X-axis direction to make the length of the light path between the first lens module 120 and the second lens module 140 shorter. As described above, when the length of the light path between the first lens module 120 and the second lens module 140 changes, the magnification of the camera module 100 changes.

The first driver 191 may include an actuator for applying a driving force to the first reflective member 130. For example, the first driver 191 may include a voice coil motor (VCM) actuator. The VCM actuator may include a coil (not shown) and a magnet (not shown) opposing each other and respectively mounted on the first reflective member 130 and the housing 110. An electromagnetic interaction between the coil and the magnet may move the first reflective member 130 with respect to the housing 110.

The first driver 191 may include a structure for guiding a movement of the first reflective member 130. For example, a ball bearing (not shown) may be disposed between the first reflective member 130 or a member carrying the first reflective member 130 and the housing 110. A groove (not shown) in which the ball bearing is seated may be formed in the first reflective member 130 or the housing 110. The groove may extend in a direction parallel to the first optical axis C1 or the second optical axis C2. While the ball bearing rolls along the groove, the first reflective member 130 may smoothly move in the direction B parallel to the first optical axis C1 or the second optical axis C2 with respect to the housing 110.

The camera module 100 may include a second driver 192 for adjusting a length of a light path between the second lens module 140 and the image sensor 160.

The second driver 192 may move the second reflective member 150 with respect to the image sensor 160 and the second lens module 140. Alternatively, the second driver 192 may move the second reflective member 150 with respect to the housing 110.

The second driver 192 may move the second reflective member 150 in a direction A parallel to the second optical axis C2 or the third optical axis C3 to adjust the length of the light path between the second lens module 140 and the image sensor 160. When the length of the light path between the second lens module 140 and the image sensor 160 changes, the focus of the camera module 100 changes.

The second driver 192 may include an actuator for applying a driving force to the second reflective member 150. For example, the second driver 192 may include a VCM actuator. The VCM actuator may include a coil (not shown) and a magnet (not shown) opposing each other and respectively mounted on the second reflective member 150 and the housing 110. An electromagnetic interaction between the coil and the magnet may move the second reflective member 150 with respect to the housing 110.

The second driver 192 may include a structure for guiding a movement of the second reflective member 150. For example, a ball bearing may be disposed between the second reflective member 150 or a member supporting the second reflective member 150 and the housing 110. A groove (not shown) in which the ball bearing is seated may be formed in the second reflective member 150 or the housing 110. The groove may extend in a direction parallel to the second optical axis C2 or the third optical axis C3. As the ball bearing rolls along the groove, the second reflective member 150 may smoothly move in the direction A parallel to the second optical axis C2 or the third optical axis C3 with respect to the housing 110.

Each of the first reflective member 130 and the second reflective member 150 may be movably coupled to the housing 110. In addition, the first lens module 120 and the second lens module 140 may be fixedly coupled to the housing 110.

The first and second reflective members 130 and 150 may be lighter than the first and second lens modules 120 and 140 so that power consumed to drive the first and second reflective members 130 and 150 may be less than power that would be consumed to drive the first and second lens modules 120 and 140. Accordingly, it may be advantageous in terms of power consumption to move the first and second reflective members 130 and 150 instead of the first and second lens modules 120 and 140 to adjust the magnification or the focus.

The camera module 100 may change lengths of light paths by driving the first and second reflective members 130 and 150 instead of the first and second lens modules 120 and 140 so that a focus adjustment function and a magnification adjustment function that are the same as a focus adjustment function and a magnification adjustment function performed by moving the first and second lens modules 120 and 140 may be implemented with less power consumption. That is, in the camera module 100 of FIG. 1, it is possible to implement a magnetic field structure having a smaller size than in a conventional camera module.

In addition, each of the first reflective member 130 and the second reflective member 150 may be configured to bend a path of travel of light multiple times so that an amount of change in a length of the light path may be relatively greater than an amount of movement of first reflective member 130 and the second reflective member 150. Accordingly, the camera module 100 may effectively adjust a magnification or a focus of the image by moving the reflective members 130 and 150 with a small stroke range. Due to such a technical advantage, the camera module 100 of FIG. 1 may be very advantageous in terms of a low-power and low magnetic field design. For example, a relatively small permanent magnet may be used in a VCM actuator, and the power consumed to adjust the magnification or the focus may be reduced.

When the first reflective member 130 moves a distance L, the length of the light path between the first lens module 120 and the second lens module 140 may change by 2 L. For example, when the first reflective member 130 moves by a distance X1 in the X-direction, a distance on the first optical axis C1 between the first lens module 120 and the first reflective surface 131 may change by X1, a distance on the fourth optical axis C4 between the first reflective surface 131 and the second reflective surface 132 may not change, and a distance on the second optical axis C2 between the second lens module 140 and the second reflective surface 132 may change by X1. Accordingly, when the first reflective member 130 moves by the distance X1, the length of the light path between the first lens module 120 and the second lens module 140 may change by 2X1. Accordingly, even if the driving distance or stroke of the first reflective member 130 is small, the length of the light path between the first lens module 120 and the second lens module 140 may be changed by an amount sufficient to adjust the magnification of the image.

When the second reflective member 150 moves by L, the length of the light path between the second lens module 140 and the image sensor 160 may change by 2 L. For example, when the second reflective member 150 move by a distance X2 in the X-direction, a distance on the second optical axis C2 between the second lens module 140 and the third reflective surface 151 may change by X2, a distance on the fifth optical axis C5 between the third reflective surface 151 and the fourth reflective surface 152 may not change, and a distance on the third optical axis C3 between the image sensor 160 and the fourth reflective surface 152 may change by X2. Accordingly, when the second reflective member 150 moves by the distance X2, the length of the light path between the second lens module 140 and the image sensor 160 may change by 2X2. Accordingly, even if the driving distance or stroke of the second reflective member 150 is small, the length of the light path between the second lens module 140 and the image sensor 160 may be changed by an amount sufficient to adjust the focus.

The camera module 100 may further include a third reflective member 170 disposed on an object side of the first lens module 120. The third reflective member 170 may bend the path of light entering along a sixth optical axis C6 parallel to a Z-axis to the direction of the first optical axis C1. Referring to FIGS. 1 and 4 together, an electronic device 10 including the camera module 100 may have a thickness in a Z-direction. The camera module 100 may be mounted in the electronic device 10 in the manner illustrated in FIG. 4. The third reflective member 170 may bend light incident in the Z-direction to the X-direction. Accordingly, even when a light path from the first lens module 120 to the image sensor 160 is increased, a thickness of the camera module 100 in the Z-direction may be maintained at an appropriate thickness, which may contribute to a reduction in the thickness of the electronic device 10.

In the camera module 100, the first and second lens modules 120 and 140 may be fixed with respect to the housing 110. In addition, the reflective members 130, 150, and 170 may be configured to be movable with respect to the housing 110.

The camera module 100 may further include an optical image stabilization (OIS) driver (not shown) for correcting shaking of an image. For example, the OIS driver may move the first reflective member 130 along the fourth optical axis C4 or the second reflective member 150 along the fifth optical axis C5.

Alternatively, the OIS driver may rotate the third reflective member 170 about the sixth optical axis C6, or may rotate the third reflective member 170 rotate about an axis perpendicular to both the sixth optical axis C6 and the first optical axis C1 (for example, an axis parallel to the Y-axis in FIG. 1.

Alternatively, the OIS driver may provide an OIS function by moving the image sensor 160 on a plane perpendicular to the third optical axis C3 (for example, a Y-Z plane of FIG. 1).

Hereinafter, another example of a camera module will be described with reference to FIG. 2.

Referring to FIG. 2, a camera module 200 includes a housing 110, a third reflective member 170, a first lens module 120, a first driver 191, a first reflective member 130, and an image sensor 160 that are the same as the housing 110, the third reflective member 170, the first lens module 120, the first driver 191, the first reflective member 130, and the image sensor 160 described above with reference to FIG. 1, and thus a repeated description may be omitted.

In the same manner as the camera module 100 of FIG. 1, the camera module 200 may be mounted in the electronic device 10 in the manner illustrated in FIG. 4.

Referring to FIG. 2, the camera module 200 may include the third reflective member 170, the first lens module 120 on which light emitted from the third reflective member 170 is incident, the first reflective member 130 on which light emitted from the first lens module 120 is incident, and the image sensor 160. The first reflective member 130 may be configured to be drivable in a direction B with respect to the first lens module 120 and the housing 110. For a detailed description thereof, FIG. 1 may be referred to.

The camera module 200 may further include a second lens module 140', a second reflective member 150', and a third lens module 180.

The second lens module 140' and the third lens module 180 each may include one or more lenses disposed along a second optical axis C2' and a third optical axis C3', respectively. Here, the second optical axis C2' and the third optical axis C3' may be different axes. For example, the second optical axis C2' and the third optical axis C3' may be parallel to each other.

The second lens module 140' and the third lens module 180 may be disposed on a light path behind the first lens module 120, and may be configured to receive light passing through the first lens module 120.

The second reflective member 150' may be disposed on a light path from the second lens module 140' to the third lens module 180. The second reflective member 150' may include a third reflective surface 151' changing a path of travel of light emitted from the second lens module 140', and a fourth reflective surface 152' changing a path of travel of light emitted from the third reflective surface 151'. The second reflective member 150' may change a path of travel of the light emitted from the second lens module 140' to be directed toward the third lens module 180.

The second lens module 140' may be disposed between a second reflective surface 132, which is an emission surface of the first reflective member 130, and the third reflective surface 151', which is an incident surface of the second reflective member 150'. In addition, the third lens module 180 may be disposed between the image sensor 160 and the fourth reflective surface 152', which an emission surface of the second reflective member 150'.

The second lens module 140' may include at least one lens defining the second optical axis C2'. That is, the lens of the second lens module 140' may be disposed along the second optical axis C2'. The second optical axis C2' may be parallel to a first optical axis C1. In addition, the second optical axis C2' may be substantially perpendicular to the fourth optical axis C4.

The second lens module 140' may be disposed to oppose at least a portion of the first reflective member 130 and at least a portion of the second reflective member 150' in a direction of the second optical axis C2'. For example, the second lens module 140' may be disposed so that light emitted from the second reflective surface 132 of the first reflective member 130 in the direction of the second optical axis C2' is incident on the second lens module 140'. Light passing through the second lens module 140' may enter the second reflective member 150' along the second optical axis C2'.

The third lens module 180 may include at least one lens disposed along the third optical axis C3'. The third optical axis C3' may be parallel to the second optical axis C2'. In addition, the third optical axis C3' may be substantially perpendicular to a fifth optical axis C5'.

The third lens module 180 may be disposed to oppose at least a portion of the second reflective member 150' in a direction of the third optical axis C3'. For example, the third lens module 180 may be disposed so that light emitted from the fourth reflective surface 152' of the second reflective member 150' in the direction of the third optical axis C3' is incident on the third lens module 180. Light passing through the third lens module 180 may be incident on the image sensor 160 in the direction of the third optical axis C3'.

The first reflective member 130 may be moved by the first driver 191 shown schematically in FIG. 2 in a direction B parallel to the first optical axis C1 or the second optical axis C2' (for example, in the X-axis direction). Accordingly, a length of a light path between the first lens module 120 and the second lens module 140' may be changed. A zoom magnification may be adjusted depending on the change in the length of the light path.

As the length of the light path between the first lens module 120 and the second lens module 140' changes, the resolution of the camera module 200 may change.

In order to prevent a resolution from being degraded, the second reflective member 150' may be moved in a direction A parallel to the second optical axis C2' or the third optical axis C3' (for example, in the X-axis direction) so that a length of a light path between the second lens module 140' and the third lens module 180 may be changed.

The camera module 100 may further include a second driver 192' shown schematically in FIG. 2 for adjusting the length of the light path between the second lens module 140' and the third lens module 180.

The second driver 192' may move the second reflective member 150' with respect to the second lens module 140' and the third lens module 180. Alternatively, the second driver 192' may move the second reflective member 150' with respect to the housing 110.

The second driver 192' may move the second reflective member 150' in the direction A parallel to the second optical axis C2' or the third optical axis C3' to adjust the length of the light path between the second lens module 140' and the third lens module 180.

The second driver 192' may include an actuator providing a driving force to the second reflective member 150'. For example, the second driver 192' may include a VCM actuator. The VCM actuator may include a coil (not shown) and a magnet (not shown) opposing each other respectively mounted on the second reflective member 150' and the housing 110, and an electromagnetic interaction between the coil and the magnet may move the second reflective member 150' with respect to the housing 110.

The second driver 192' may include a structure for guiding a movement of the second reflective member 150'. For example, a ball bearing (not shown) may be disposed between the second reflective member 150' or a member carrying the second reflective member 150' and the housing 110. A groove (not shown) in which the ball bearing is seated may be formed in the second reflective member 150' or the housing 110. The groove may extend in a direction parallel to the second optical axis C2' or the third optical axis C3'. As the ball bearing rolls along the groove, the second reflective member 150' may smoothly move with respect to the housing 110 in the direction A parallel to the second optical axis C2' or the third optical axis C3'.

The second driver 192' driving the second reflective member 150' may be interlocked with the first driver 191 driving the first reflective member 130 to set a movement distance of the second reflective member 150'. That is, in the camera module 200, the length of the light path between the second lens module 140' and the third lens module 180 may be interlocked with an amount of change in the length of the light path between the first lens module 120 and the second lens module 140', and accordingly may be changed.

As described above, the second reflective member 150' may appropriately change the length of the light path between the second lens module 140' and the third lens module 180, thereby compensating for a change in the length of the light path between the first lens module 120 and the second lens module 140' and preventing a degradation in resolution caused by adjusting a zoom magnification.

In addition, when compared to the camera module 100 of FIG. 1, more accurate control may be performed by increasing the number of lens modules involved in adjusting a zoom magnification, and a size of an individual lens module may be designed in a more optimized manner.

Each of the first reflective member 130 and the second reflective member 150' may be configured to bend a path of travel of light multiple times so that an amount of change in a length of a light path may be relatively greater than an amount of movement of the first reflective member 130 and the second reflective member 150'. Accordingly, the camera module 100 may effectively change a length of a light path between lens modules by moving a reflective member with a small stroke.

When the second reflective member 150' moves by L, the length of the light path between the second lens module 140' and the third lens module 180 may change by 2 L. For example, when the second reflective member 150' moves by X2 in the X-direction, a distance on the second optical axis C2' between the second lens module 140' and the third reflective surface 151' may change by X2, a distance on the fifth optical axis C5' between the third reflective surface 151' and the fourth reflective surface 152' may not change, and a distance on the third optical axis C3' between the fourth reflective surface 152' and the third lens module 180 may change by X2. Accordingly, when the second reflective member 150' moves by X2, the length of the light path between the second lens module 140' and the third lens module 180 may change by 2X2. Accordingly, even when the second reflective member 150' has a small stroke, the length of the light path between the second lens module 140' and the third lens module 180 may be sufficiently changed.

In the camera module 200, the first, second, and third lens modules 120, 140', and 180 may be disposed to be fixed with respect to the housing 110. In addition, the first, second, and third reflective members 130, 150', and 170 may be configured to be movable with respect to the housing 110.

The camera module 200 may effectively adjust the magnification and prevent a degradation in the resolution by moving the first and second reflective members 130 and 150' with a small stroke. Due to such a technical advantage, the camera module 200 may be very advantageous in terms of a low-power and low-field design. For example, a relatively small permanent magnet may be used as an actuator, and power consumed to adjust magnification or focus may be reduced.

The camera module 200 may further include a third driver 193 for adjusting a focus by moving the image sensor 160. The third driver 193 may be configured to drive the image sensor 160 in a direction parallel to the third optical axis C3'. Accordingly, a focus adjustment function may be performed by adjusting a distance between the third lens module 180 and the image sensor 160.

The camera module 200 may include an OIS driver (not shown) to provide an OIS function by moving the image sensor 160 on a plane perpendicular to the third optical axis C3' (for example, a Y-Z plane of FIG. 2). For a description thereof, FIG. 1 may be referred to.

Hereinafter, another example of a camera module will be described with reference to FIG. 3.

Referring to FIG. 3, a camera module 300 includes a first reflective member 130, a second lens module 140, a second reflective member 150, and an image sensor 160 that are the same as the first reflective member 130, the second lens module 140, the second reflective member 150, and the image sensor 160 described with reference to FIG. 1, and thus a repeated description may be omitted.

In the same manner as the camera module 100 of FIG. 1, the camera module 300 may be mounted in the electronic device 10 in the manner illustrated in FIG. 4.

Referring to FIG. 3, the camera module 300 may include a first lens module 220, the second lens module 140, the first reflective member 130, the second reflective member 150, a third reflective member 270, and the image sensor 160.

The first lens module 220 may include at least one lens disposed along a sixth optical axis C6. Light incident on the camera module 300 from an external subject may enter the third reflective member 270 after passing through the first lens module 220 along the sixth optical axis C6.

The third reflective member 270 may be disposed to oppose the first lens module 220 to bend light entering along a sixth optical axis C6 along a first optical axis C1. For example, the third reflective member 270 may be formed as a prism or a mirror having a reflective surface capable of reflecting light.

The third reflective member 270 may change a path of travel of light incident in a direction of the sixth optical axis C6 so that the light may travel in a direction of the first optical axis C1 substantially perpendicular to the sixth optical axis C6. For example, referring to FIG. 3, the sixth optical axis C6 may be parallel to a Z-axis, and the first optical axis C1 may be parallel to an X-axis.

In addition, the reflective member 270 may be disposed to oppose the first reflective member 130 in the direction of the first optical axis C1. Accordingly, light emitted from the third reflective member 270 may enter the first reflective member 130 along the first optical axis C1. The first reflective member 130 may include a first reflective surface 131 bending light entering along the first optical axis C1 along a fourth optical axis C4. The first optical axis C1 and the fourth optical axis C4 may be perpendicular or substantially perpendicular to each other. For example, the first optical axis C1 may be parallel to the X-axis, and the fourth optical axis C4 may be parallel to a Y-axis. The first reflective surface 131 may form an angle of 45 degrees with respect to the first optical axis C1.

The first reflective member 130 may further include a second reflective surface 132. Light entering the second reflective surface 132 from the first reflective surface 131 along the fourth optical axis C4 may be reflected again perpendicularly or substantially perpendicularly, and may be directed toward the second lens module 140.

The second lens module 140 may include at least one lens defining a second optical axis C2. The first optical axis C1 and the second optical axis C2 may be parallel to each other. Light entering the second reflective surface 132 along the fourth optical axis C4 may be bent along the second optical axis C2. The second optical axis C2 may be perpendicular or substantially perpendicular to the fourth optical axis C4. For example, the second optical axis C2 may be parallel to the X-axis, and the fourth optical axis C4 may be parallel to the Y-axis. The second reflective surface 132 may form an angle of 45 degrees with respect to the second optical axis C2.

Light passing through the second lens module 1140 may enter the second reflective member 150 along the second optical axis C2. The second reflective member 150 may cause light incident on the second optical axis C2 to be emitted along a third optical axis C3 parallel to the second optical axis C2. The second reflective member 150 may bend light entering the third reflective surface 152 along the second optical axis C2 to a fifth optical axis C5. The fifth optical axis C5 may be perpendicular or substantially perpendicular to the second optical axis C2. For example, the fifth optical axis C5 may be parallel to the Y-axis, and the second optical axis C2 may be parallel to the X-axis. The third reflective surface 151 may form an angle of 45 degrees with respect to the second optical axis C2. Light traveling from the third reflective surface 151 to the fourth reflective surface 152 along the fifth optical axis C5 may be bent along the third optical axis C3. The third optical axis C3 may be parallel to the second optical axis C2. For example, the third optical axis C3 may be parallel to the X-axis. Light reflected by the fourth reflective surface 253 may enter an imaging surface 161 of the image sensor 160 along the third optical axis C3. For example, the fourth reflective surface 152 may form an angle of 45 degrees with respect to the third optical axis C3.

The third reflective surface 151 and the fourth reflective surface 152 may form an angle of 90 degrees with respect to each other. The light may form a C-shaped light path from the second lens module 140 to the image sensor 160.

The camera module 300 may include a first driver 191 shown schematically in FIG. 3 for adjusting a length of a light path the first lens module 220 and the second lens module 140. The first driver 191 may move the first reflective member 130 in a direction B parallel to the first optical axis C1 or the second optical axis C2 to adjust a length of the light path between the first lens module 220 and the second lens module 140. When the length of the light path between the first lens module 220 and the second lens module 140 changes, a magnification may be adjusted.

The camera module 300 may include a second driver 192 shown schematically in FIG. 3 for adjusting a length of a light path between the second lens module 140 and the image sensor 160. The second driver 192 may move the second reflective member 150 in a direction A parallel to the second optical axis C2 or the third optical axis C3 to adjust the length of the light path between the second lens module 140 and the image sensor 160. When the length of the light path between the second lens module 140 and the image sensor 160 changes, a focus may be adjusted.

In the camera module 300, among optical members included in the camera module 300, the first lens module 220 may be disposed on a frontmost portion of a light path. In this case, the first lens module 220 may be disposed outside the housing 110 in which the third reflective member 270 and the second lens module 140 are accommodated. Alternatively, a lens holder (not shown) accommodating the first lens module 220 therein may be provided, and the lens holder may be coupled to the housing 110 to form the exterior of the entire camera module 300.

Since a lens module is omitted between the third reflective member 270 and the first reflective member 130, an extra internal space of the housing 110 may be secured.

In addition, since the first lens module 220 is disposed in front of the third reflective member 270, as described above, an overall size of the camera module 300 may be further reduced.

FIG. 3 illustrates a state in which a third lens module is not disposed between the second reflective member 150 and the image sensor 160, but such a configuration is merely an example, and the camera module 300 may further include such a third lens module (now shown) having the third optical axis C3 disposed between the second reflective member 150 and the image sensor 160. The second reflective member 150 may move in a direction parallel to the second optical axis C2 or the third optical axis C3 to change a length of a light path between the second lens module 140 and the third lens module having the third optical axis C3. In this case, the second driver 192 for driving the second reflective member 150 may be configured to appropriately move the second reflective member 150 in response to an amount of movement of the first reflective member 130.

In the camera module 300, the first and second lens modules 220 and 140 may be with respect to the housing 110. In addition, the first, second, and third reflective members 130, 150, and 270 may be configured to be movable with respect to the housing 110.

The camera module 300 may further include an OIS driver for correcting shaking of an image. For example, the OIS driver may move the first reflective member 130 along the fourth optical axis C4 or the second reflective member 150 along the fifth optical axis C5.

Alternatively, the OIS driver may perform an OIS function by rotating the third reflective member 270 about the sixth optical axis C6 or rotating the third reflective member 270 about an axis perpendicular to both the sixth optical axis C6 and the first optical axis C1 (for example, an axis parallel to the Y-axis in FIG. 3).

Alternatively, the OIS driver may provide the OIS function by moving the image sensor 160 on a plane perpendicular to the third optical axis C3 (for example, a Y-Z plane of FIG. 3).

While this disclosure includes specific examples, it will be apparent after an understanding of the disclosure of this application that various changes in form and details may be made in these examples without departing from the spirit and scope of the claims and their equivalents. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
a plurality of lens modules having mutually different optical axes;
a plurality of reflective members configured to change a path of light passing through at least one of the plurality of lens modules; and
a housing having an internal space in which at least one of the plurality of lens modules is disposed,
wherein the plurality of lens modules comprise:
a first lens module comprising at least one lens disposed along a first optical axis;
a second lens module comprising at least one lens disposed along a second optical axis different from the first optical axis; and
a third lens module comprising at least one lens disposed along a third optical axis different from the first optical axis and the second optical axis, and
the plurality of reflective members comprise:
a first reflective member opposing both the first lens module and the second lens module; and
a second reflective member opposing both the second lens module and the third lens module.

2. The camera module of claim 1, further comprising:
a first driver configured to generate a driving force for moving the first reflective member with respect to the first lens module and the second lens module; and
a second driver configured to generate a driving force for moving the second reflective member with respect to the second lens module and the third lens module.

3. The camera module of claim 2, wherein the first lens module, the second lens module, and the third lens module are fixed with respect to the housing.

4. The camera module of claim 2, wherein the first reflective member comprises a first reflective surface through which the first optical axis passes and a second reflective surface through which the second optical axis passes, and
the second reflective member comprises a third reflective surface through which the second optical axis passes and a fourth reflective surface through which the third optical axis passes.

5. The camera module of claim 2, wherein the first reflective member is configured to be movable with respect to the housing in a first direction, and
the second reflective member is configured to be movable with respect to the housing in a second direction parallel to the first direction.

6. The camera module of claim 1, further comprising an image sensor on which light passing through the plurality of lens modules is incident.

7. The camera module of claim 1, wherein the first optical axis, the second optical axis, and the third optical axis are parallel to each other.

8. The camera module of claim 1, further comprising a third reflective member opposing the first reflective member;
wherein the first lens module is disposed between the third reflective member and the first reflective member.

9. A camera module comprising:
a first lens module comprising at least one lens disposed along a first optical axis;
a second lens module comprising at least one lens disposed along a second optical axis different from the first optical axis;
an image sensor having an imaging surface perpendicular to a third optical axis parallel to the second optical axis;
a first reflective member configured to change a path of light passing through the first lens module to the second optical axis;
a second reflective member configured to change a path of light passing through the second lens module along the second optical axis to the third optical axis;
a first driver configured to move the first reflective member in a first direction parallel to the second optical axis; and
a second driver configured to move the second reflective member in a second direction parallel to the second optical axis and different from the first direction.

10. The camera module of claim 9, further comprising a housing in which the second lens module, the first reflective member, and the second reflective member are disposed,
wherein the first lens module and the second lens module are fixedly coupled to the housing, and the first reflective member and the second reflective member are movably coupled to the housing.

11. The camera module of claim 9, further comprising a third reflective member disposed on an object side of the first lens module and configured to change a path of light incident on the third reflective member along an optical axis intersecting the first optical axis to the first optical axis,
wherein the first reflective member is further configured to change a path of light passing through the first lens module along the first optical axis to the second optical axis.

12. The camera module of claim 9, further comprising a third lens module disposed between the second reflective member and the image sensor and comprising at least one lens disposed along the third optical axis.

13. The camera module of claim 12, further comprising a third driver configured to move the image sensor in a third direction parallel to the third optical axis.

14. The camera module of claim 9, wherein the first reflective member comprises a first reflective surface forming an angle of 45 degrees with respect to the first optical axis and a second reflective surface forming an angle of 90 degrees with respect to the first reflective surface, and
the second reflective member comprises a third reflective surface forming an angle of 45 degrees with respect to the second optical axis and a fourth reflective surface forming an angle of 90 degrees with respect to the third reflective surface.

15. The camera module of claim 9, further comprising a third reflective member disposed on an image side of the first lens module and configured to change a path of light passing through the first lens module along the first optical axis to an optical axis perpendicular to the first optical axis,
wherein the first reflective member is further configured to change a path of light from the first lens module and the third reflective member traveling along the optical axis perpendicular to the first optical axis to the second optical axis.

16. The camera module of claim 15, wherein the first optical axis and the second optical axis are perpendicular to each other, and
the third reflective member opposes the first reflective member in a direction parallel to the second optical axis.

17. A camera module comprising:
a first lens module comprising at least one lens disposed along a first optical axis;
a second lens module comprising at least one lens disposed along a second optical axis different from the first optical axis;
an image sensor having an imaging surface perpendicular to a third optical axis different from the first optical axis and the second optical axis and parallel to the second optical axis;
a first reflective member configured to change a path of light passing through the first lens module to the second optical axis and to be movable in a first direction parallel to the second optical axis to adjust a magnification of the camera module; and
a second reflective member configured to change a path of light passing through the second lens module along the second optical axis to the third optical axis and to be movable in a second direction parallel to the second optical axis and different from the first direction.

18. The camera module of claim 17, wherein the second reflective member is further configured to be movable in the second direction to adjust a focus of the camera module.

19. The camera module of claim 17, further comprising a third lens module disposed between the second reflective member and the image sensor and comprising at least one lens disposed along the third optical axis,
wherein the second reflective member is further configured to be movable in the second direction to prevent a degradation of a resolution of the camera module as the magnification of the camera module is adjusted by a movement of the first reflective member, and
the image sensor is configured to be movable in a third direction parallel to the third optical axis to adjust a focus of the camera module.

20. The camera module of claim 19, wherein a distance the second reflective member moves in the second direction to prevent the degradation of the resolution of the camera module depends on a distance the first reflective member moves in the first direction to adjust the magnification of the camera module.

21. A camera module comprising:
a first lens module comprising at least one lens disposed along a first optical axis;
a second lens module comprising at least one lens disposed along a second optical axis different from the first optical axis;
a first reflective member configured to change a path of light passing through the first lens module to the second optical axis and to be movable in a first direction parallel to the second optical axis;
a second reflective member configured to change a path of light passing through the second lens module along the second optical axis to a third optical axis different from the first optical axis and the second optical axis and parallel to the second optical axis; and
a housing in which the second lens module, the first reflective member, and the second reflective member are disposed,
wherein the first lens module and the second lens module are fixed with respect to the housing,
the first reflective member is configured to be movable with respect to the housing in a first direction parallel to the second optical axis, and
the second reflective member is configured to be movable with respect to the housing in a second direction parallel to the second optical axis and different from the first direction.

22. The camera module of claim 21, further comprising a third reflective member disposed in the housing,
wherein the first lens module is disposed in the housing between the third reflective member and the first reflective member and is fixed with respect to the housing,
the third reflective member is configured to change a path of light incident on the third reflective member along an optical axis perpendicular to the first optical axis to the first optical axis, and
the first optical axis is different from and parallel to the second optical axis and the third optical axis.

23. The camera module of claim 21, further comprising a third reflective member disposed in the housing and facing the first reflective member along the first optical axis;
an image sensor disposed in the housing and facing the second reflective member along the third optical axis; and
a third lens module disposed in the housing between the second reflective member and the image sensor and comprising at least one lens disposed along the third optical axis,
wherein the first lens module is disposed between the third reflective member and the first reflective member and is fixed with respect to the housing, and
the image sensor is configured to be movable with respect to the housing in a third direction parallel to the third optical axis.

24. The camera module of claim 21, further comprising a third reflective member disposed in the housing,
wherein the first lens module is disposed outside the housing facing the first reflective member,
the third reflective member is configured to change a path of light passing through the first lens module along the first optical axis to an optical axis perpendicular to the first optical axis and parallel to and different from the second optical axis and the third optical axis, and
the first optical axis is different from and perpendicular to the second optical axis and the third optical axis.

* * * * *